US010545589B2

(12) United States Patent
Gotoh et al.

(10) Patent No.: US 10,545,589 B2
(45) Date of Patent: Jan. 28, 2020

(54) TOUCH DETECTION DEVICE

(71) Applicant: Japan Display Inc., Tokyo (JP)

(72) Inventors: Fumitaka Gotoh, Tokyo (JP); Hiroshi Mizuhashi, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/959,699

(22) Filed: Apr. 23, 2018

(65) Prior Publication Data

US 2018/0307340 A1 Oct. 25, 2018

(30) Foreign Application Priority Data

Apr. 24, 2017 (JP) .................................. 2017-085167

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC ...... G06F 3/0412; G06F 3/0416; G06F 3/041; G06F 3/046; G06F 2203/04108; G06F 2203/04103
See application file for complete search history.

(56) References Cited

U.S. PATENT DOCUMENTS

| 2010/0066692 | A1* | 3/2010 | Noguchi | G06F 3/0412 345/173 |
| 2011/0115733 | A1* | 5/2011 | Shih | G06F 3/0412 345/173 |
| 2013/0076646 | A1* | 3/2013 | Krah | G06F 3/0414 345/173 |
| 2015/0277601 | A1* | 10/2015 | Tahara | G06F 3/03545 345/173 |
| 2016/0291785 | A1 | 10/2016 | Mizuhashi et al. | |
| 2016/0349915 | A1* | 12/2016 | Sekizawa | G06F 3/0418 |

FOREIGN PATENT DOCUMENTS

JP 2016-194580 A 11/2016

OTHER PUBLICATIONS

Zane Crawford, Instrumentation Amplifiers: A guide to instrumentation amplifiers and how to proper use the INA326, Mar. 21, 2014, ECE 480 Application Note. (Year: 2014).*

* cited by examiner

*Primary Examiner* — Kwang-Su Yang
(74) *Attorney, Agent, or Firm* — K&L Gates LLP

(57) ABSTRACT

According to one embodiment, a touch detection device includes a touch panel including a transmitting coil and a receiving coil, the touch panel provided with a display function and a touch detection function, and a differential amplifier including two input terminals connected to first and second terminals of the receiving coil.

6 Claims, 13 Drawing Sheets

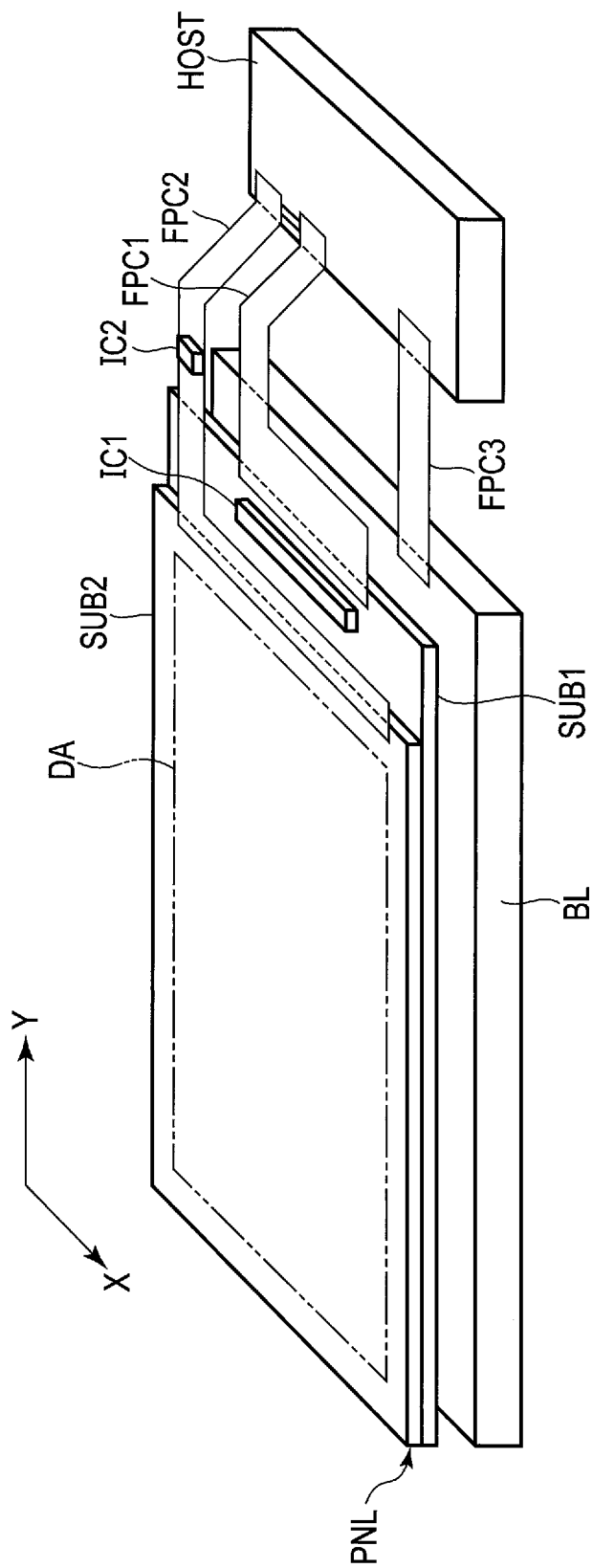
F I G. 1

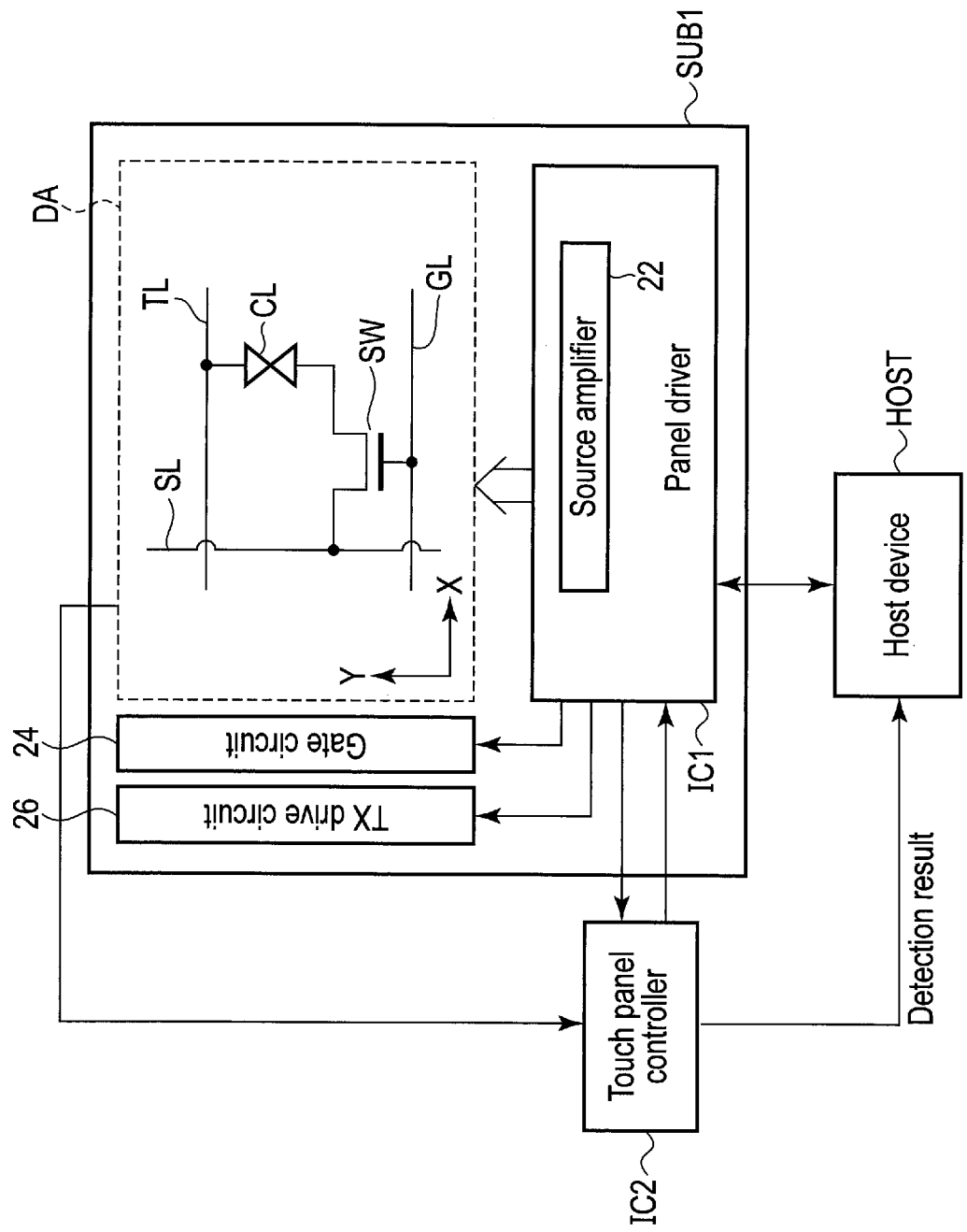
F I G. 2

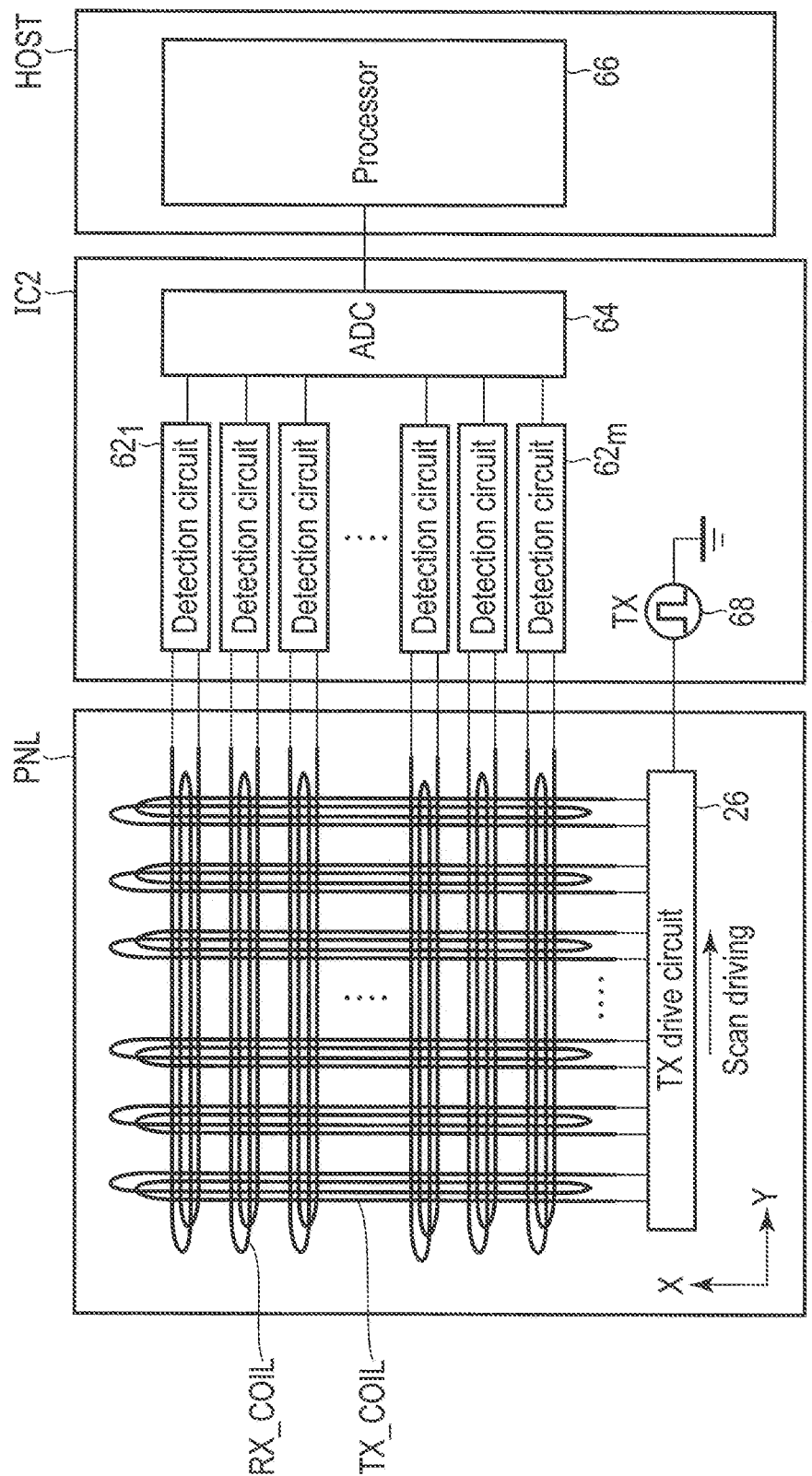
F I G. 6

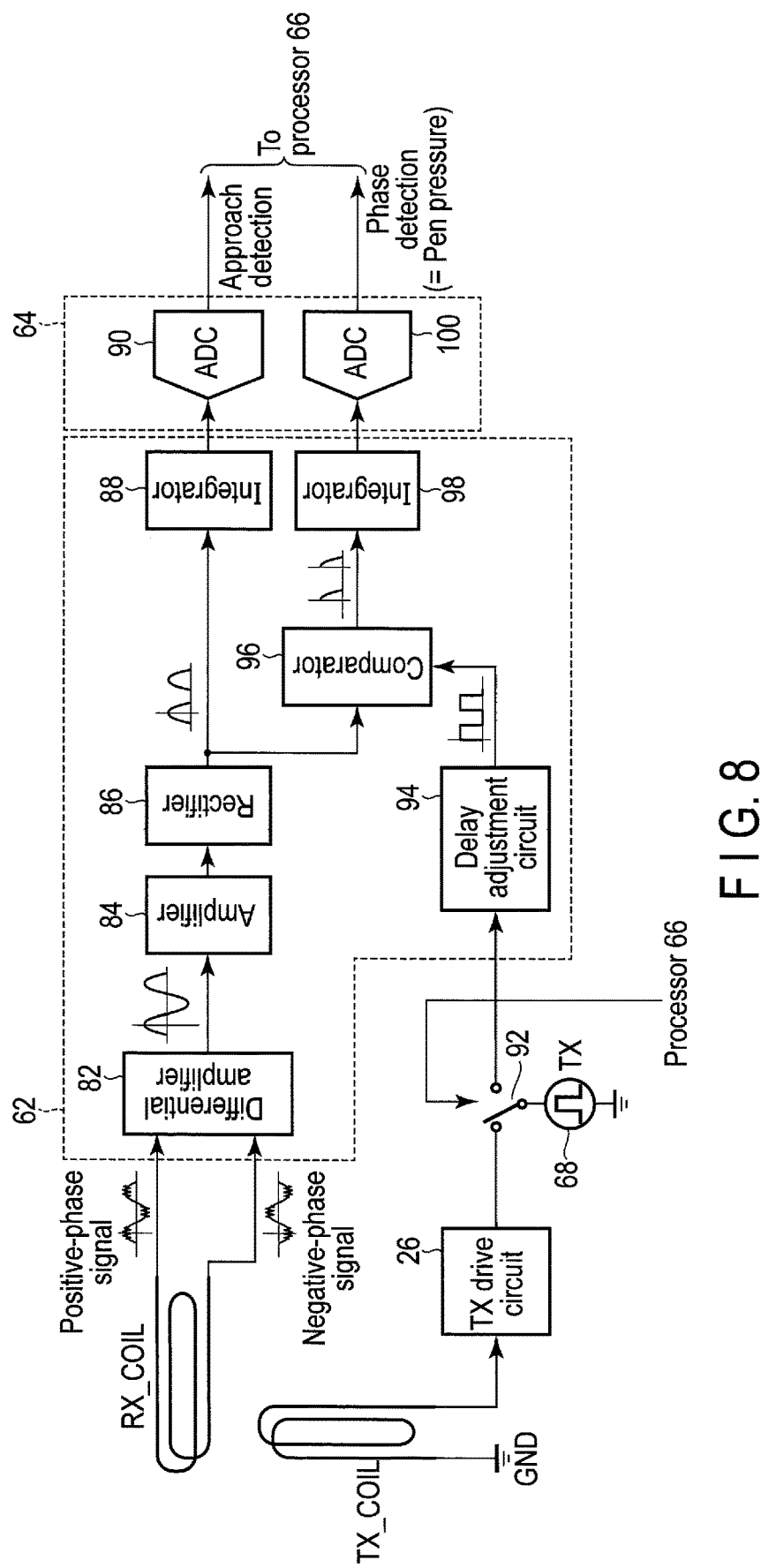
F I G. 8

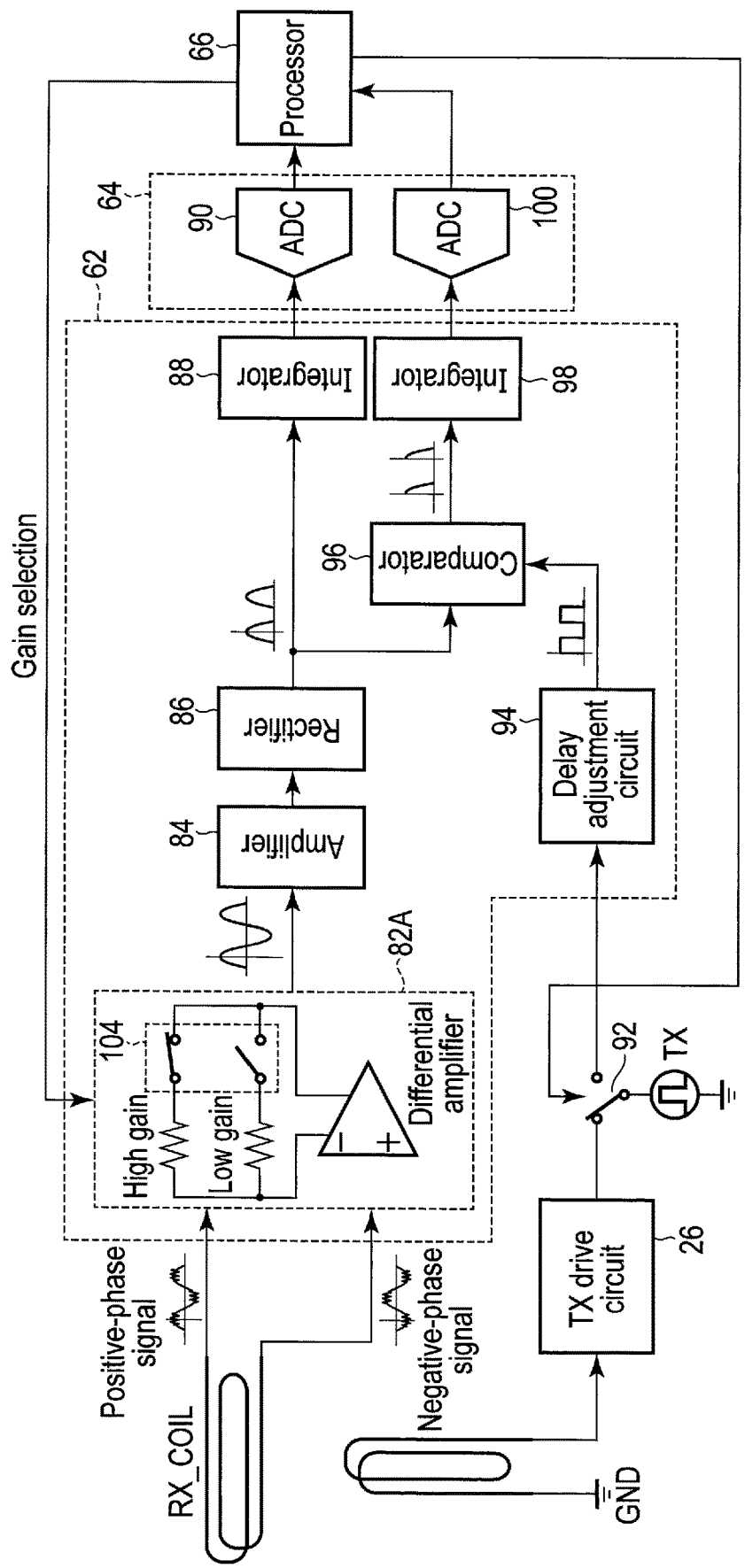
F I G. 10

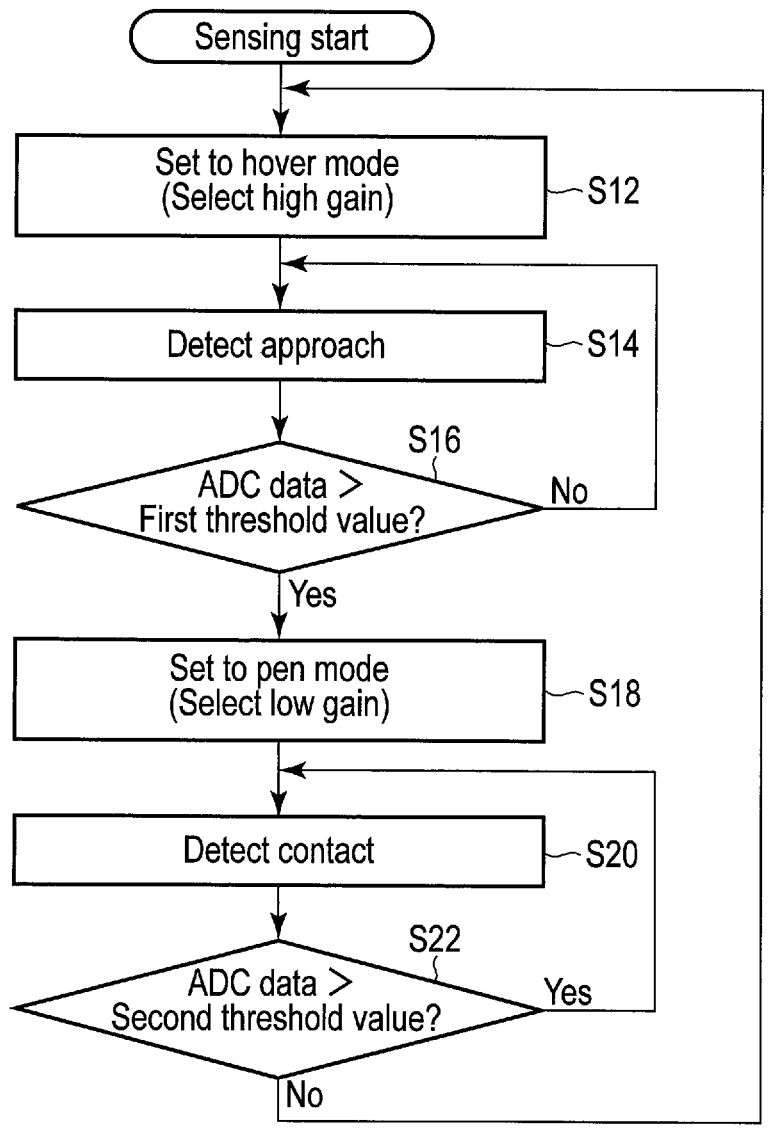
F I G. 11

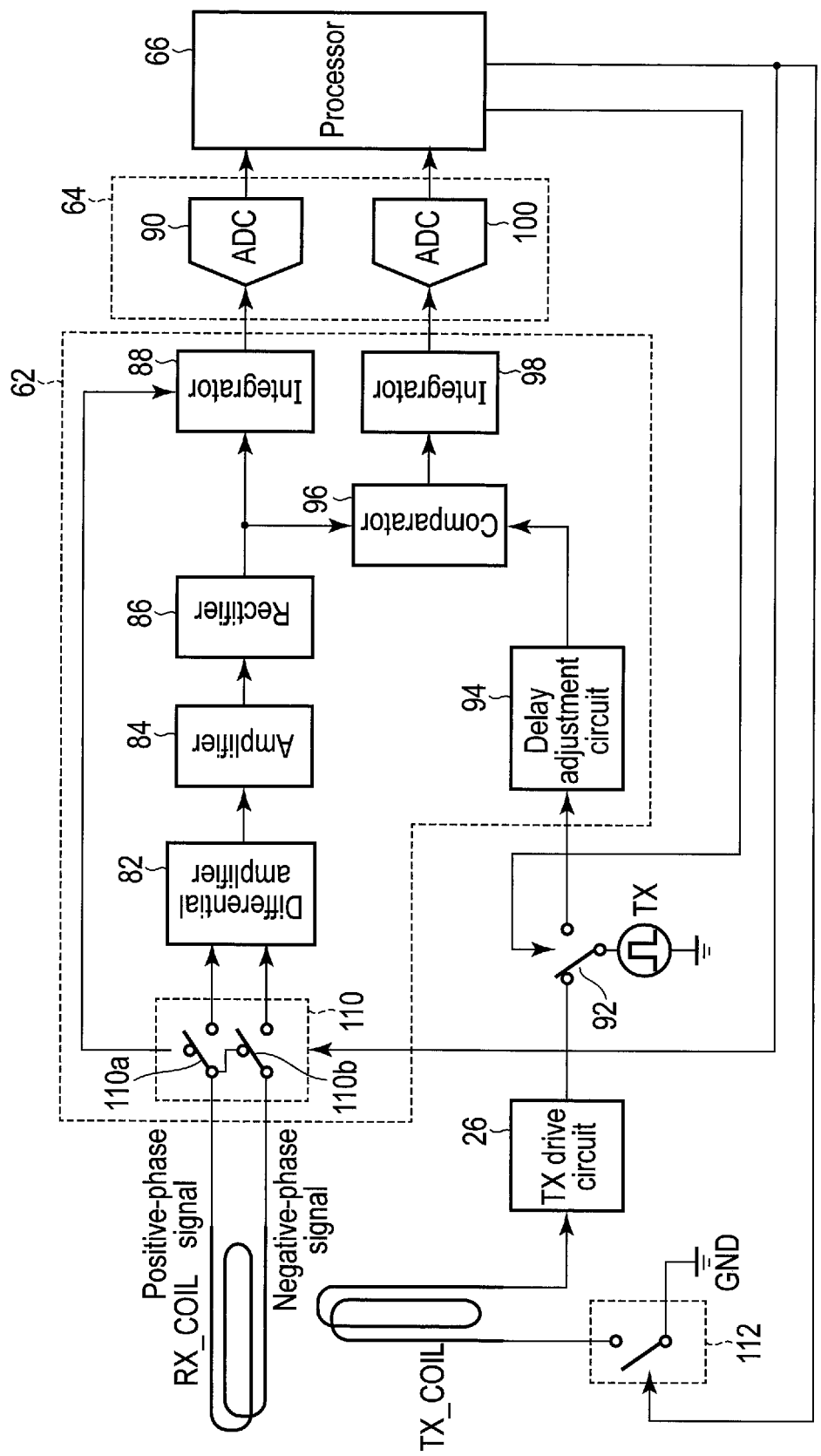
F I G. 12

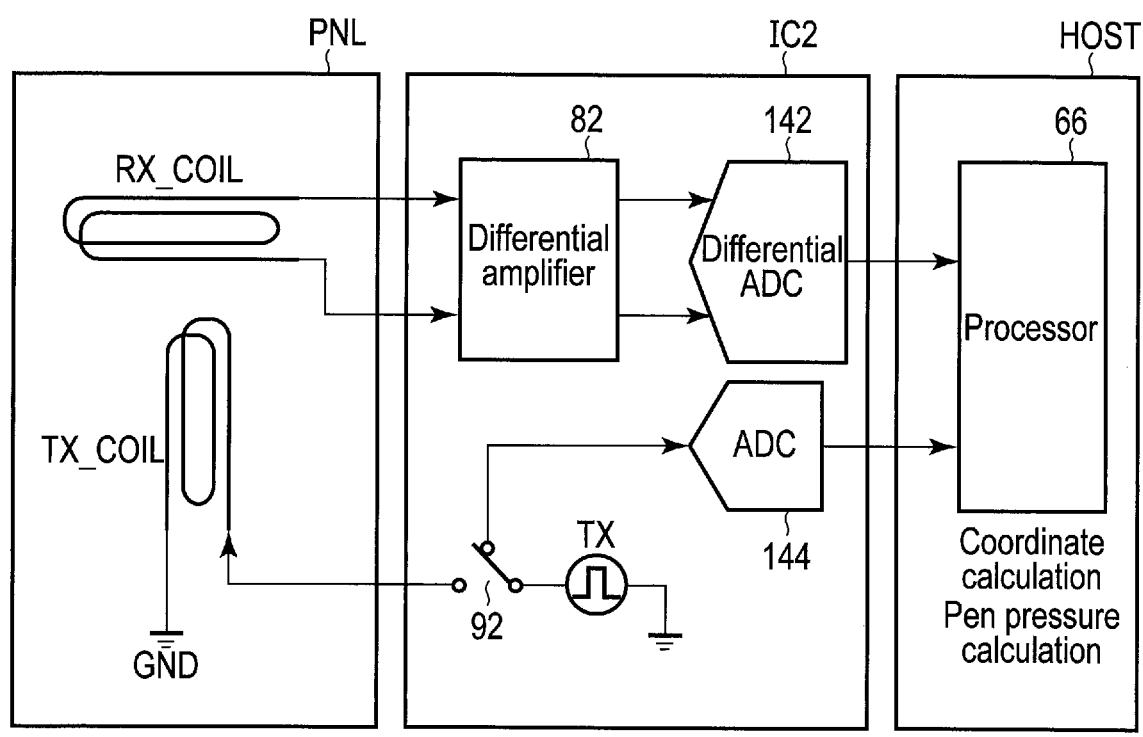
F I G. 15

TOUCH DETECTION DEVICE

CROSS-REFERENCE TO RELATED APPLICATIONS

This application is based upon and claims the benefit of priority from Japanese Patent Application No. 2017-085167, filed Apr. 24, 2017, the entire contents of which are incorporated herein by reference.

FIELD

Embodiments described herein relate generally to a touch detection device and a touch detection method.

BACKGROUND

Portable devices such as smart phones, tablet computers and notebook computers are widespread. A portable device includes a flat-panel display device using a liquid crystal or an organic EL element, etc. A display device includes a two-dimensional array of pixels, the pixel includes a common electrode and a pixel electrode, and the liquid crystal or the organic EL element is arranged between the common electrode and the pixel electrode. When a driver writes a pixel signal to the pixel, the liquid crystal or the organic EL element between the common electrode and the pixel electrode is controlled, and an image is displayed.

Meanwhile, a touch panel which detects approach or contact of an input object such as a finger or a touch pen (which is also referred to as a stylus pen) to or with a screen is widely used. An operation of approaching or contacting the input object to or with the screen is referred to as a touch operation or a touch, and detection of the position of the input object is referred to as touch detection. A small area can be specified or a handwriting character can be input more easily by the pen than by the finger. A touch of the pen can be detected by various methods, and one of the methods is an electromagnetic induction method. In the electromagnetic induction method, the pen includes a coil and a capacitor, the touch panel includes a transmitting coil and a receiving coil, the transmitting coil generates a magnetic field, magnetic field energy is stored in the capacitor of the pen, and the receiving coil detects the magnetic field.

In a display device having the electromagnetic induction type touch detection function, noises are caused by the influence of the parasitic capacitance and parasitic resistance of the display device, and detection cannot be accurate.

SUMMARY

The present application relates generally to a touch detection device and a touch detection method.

According to one embodiment, a touch detection device includes a touch panel including a transmitting coil and a receiving coil, the touch panel provided with a display function and a touch detection function, and a differential amplifier including two input terminals connected to first and second terminals of the receiving coil.

According to another embodiment, a touch detection method is provided and includes amplifying a signal induced in a receiving coil of a touch panel having a display function and a touch detection function by a differential amplifier.

BRIEF DESCRIPTION OF THE DRAWINGS

FIG. 1 is a perspective view schematically showing an example of the general structure of a display device having a touch detection function according to an embodiment.

FIG. 2 is a block circuit diagram showing an example of a pixel array.

FIG. 6 is a block circuit diagram showing an example of the display device according to the embodiment.

FIG. 8 is a block circuit diagram showing an example of a detection circuit 62.

FIG. 10 is a block circuit diagram showing an example of the detection circuit 62 according to the second embodiment.

FIG. 11 is a flowchart showing an example of the operation of the second embodiment.

FIG. 12 is a block circuit diagram showing an example of the detection circuit 62 according to the third embodiment.

FIG. 15 is a block circuit diagram showing another example of the layout of circuits for touch detection.

DETAILED DESCRIPTION

Figure 3:
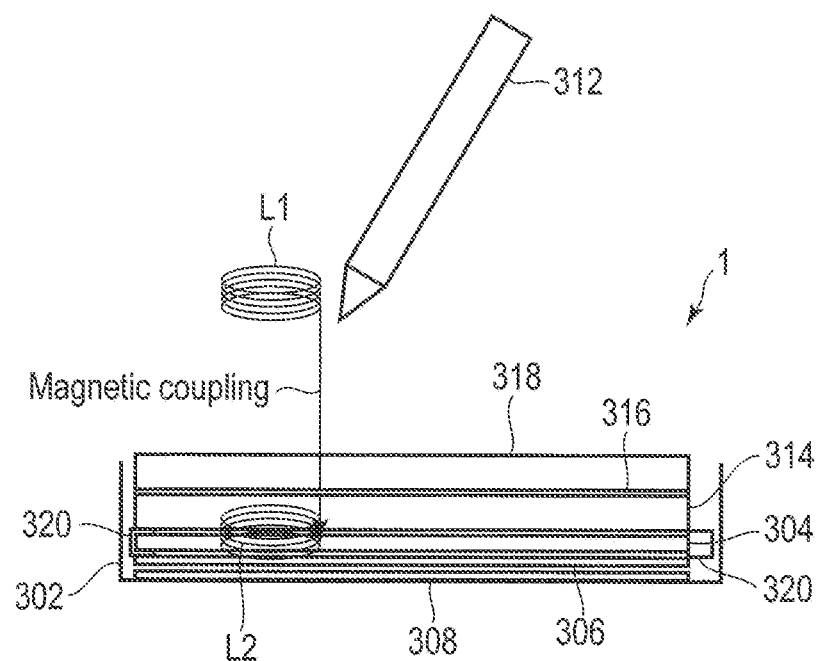
FIG. 3 is a sectional view showing an example of an electromagnetic induction type touch panel.

Embodiments will be described hereinafter with reference to the accompanying drawings. Note that the disclosure is merely an example and the invention is not limited by the contents described in the following embodiments. Modifications of the invention which are easily conceivable by a person of ordinary skill in the art come within the scope of the disclosure as a matter of course. In order to make the description clearer, the sizes, shapes, etc., of the respective parts may be modified and illustrated schematically in the drawings, rather than as an accurate representation of what is implemented, and the hatching added to the drawings to differentiate one structure from another may be omitted. In the drawings, the corresponding elements may be denoted by the same reference numbers, and detailed description thereof may be omitted unless necessary.

In general, according to one embodiment, a touch detection device includes a touch panel including a transmitting coil and a receiving coil, the touch panel provided with a display function and a touch detection function, and a differential amplifier including two input terminals connected to first and second terminals of the receiving coil.

A display device having a touch detection function includes an on-cell display device (which is also referred to as an external type) in which a display device and a touch panel are separately manufactured from each other and the touch panel is attached to the screen of the display device, and an in-cell display device (which is also referred to as a built-in type) in which a display device and a touch panel are integrated with each other. The in-cell display device includes a device in which some or all components having touch detection functions are also used as some or all components having display functions, and a device in which no component is shared between components having touch detection functions and components having display functions. In the in-cell display device, for example, a detection electrode is formed between a color filter and a polarizer, and a common electrode formed on a TFT substrate is used as a drive electrode. Since the in-cell display device does not have an externally-attached touch panel, the thickness and the weight are reduced as a whole, and the display visibility increases. An in-cell display device will be described in the embodiments, but the present invention is also applicable to an on-cell display device.

As the display device, a liquid crystal display device, an organic EL display device, a plasma display device, etc., can be used. The embodiments will be described based on the assumption that a liquid crystal display device is used as the display device, for example. However, the present invention is also applicable to an organic EL display device, a plasma display device, etc. The display modes of liquid crystal display devices are broadly classified into two display modes according to the application direction of an electric field which changes the alignment of liquid crystal molecules of a liquid crystal layer which is a display function layer. The first display mode is the so-called longitudinal electric field mode in which an electric field is applied to the thickness direction (or the out-of-plane direction) of the display device. For example, the longitudinal electric field mode includes a twisted nematic (TN) mode, a vertical alignment (VA), etc. The second display mode is the so-called lateral electric field mode in which an electric field is applied to the planar direction (or the in-plane direction) of the display device. For example, the lateral electric field includes an in-plane switching (IPS) mode, a fringe field switching (FFS) mode which is one of the IPS modes, etc. A technique which will be described below is applicable to both the longitudinal electric field mode and the lateral electric field mode, but a display device conforming to the lateral electric field mode will be described as an embodiment.

First Embodiment

[General Structure]

FIG. 1 is a perspective view schematically showing an example of the general structure of a display device having a touch detection function according to an embodiment. The display device includes a touch panel PNL, a display drive circuit, a touch detection circuit, etc. The touch panel PNL includes a first substrate SUB1 which is transparent and is formed of a material such as glass or resin, a second substrate SUB2 which is transparent, is formed of a material such as glass or resin and is opposed to the first substrate SUB1, and a liquid crystal layer (not shown) which is formed between the first substrate SUB1 and the second substrate SUB1. Since pixels formed of thin film transistors (TFTs) are arranged in a matrix on the first substrate SUB1, the first substrate SUB1 is also referred to as a pixel substrate or an array substrate. The second substrate SUB2 is also referred to as a counter-substrate. The touch panel PNL is viewed from the second substrate SUB2 side. Therefore, the second substrate SUB2 may be also referred to as an upper substrate, and the first substrate SUB1 may be also referred to as a lower substrate in some cases. The first substrate SUB1 has a plurality of conductor patterns. The conductor patterns include a plurality of scanning lines, a plurality of signal lines, a plurality of drive electrodes and a plurality of pixel electrodes. The drive electrodes may be formed of a transparent conductive material such as indium tin oxide (ITO) or indium zinc oxide (IZO). The second substrate SUB2 includes a color filter, a black matrix which serves as a light-shielding film, etc.

The touch panel PNL has the shape of a rectangular flat plate, and the direction along short sides thereof is defined as an X direction and the direction along long sides thereof is defined as a Y direction. The first substrate SUB1 and the second substrate SUB2 have short sides of the same size but have long sides of different sizes, and the first substrate SUB1 is longer than the second substrate SUB2 in the longitudinal direction (Y direction). In the longitudinal direction, since one edge (short side) of the first substrate SUB1 and one edge (short side) of the second substrate SUB2 are aligned with each other, the other edge (short side) of the first substrate SUB1 protrudes further than the other edge (short side) of the second substrate SUB2. A panel driver IC1 which constitutes a display drive circuit which drives the touch panel PNL for image display is mounted on the protruding portion of the first substrate SUB1 which protrudes from the second substrate SUB2 in the longitudinal direction. The panel driver IC1 is composed of a chip-on-glass (COG) chip. The panel driver is also referred to as a driver chip or a display controller. A TFT pixel array is formed in a display area or active area DA at the center of the first substrate SUB1.

A backlight unit BL as an illumination device which illuminates the touch panel PNL is arranged on the back side of the first substrate SUB1 (that is, on the back surface side of the touch panel PNL). Various backlight units can be used as the backlight unit BL, and a light-emitting diode (LED), a cold-cathode fluorescent tube, etc., can be used as a light source. The illumination device may include a light guide 304 which is arranged on the back surface side of the touch panel PNL, and an LED or a cold-cathode fluorescent tube which is arranged beside the light guide 304, or may include a point light source in which light emitting elements are arranged two-dimensionally on the back surface side of the touch panel PNL. The illumination device is not limited to a backlight and may be a front light arranged on the display surface side of the touch panel PNL. Further, the illumination device may be omitted if the display device is a reflective display device or the touch panel PNL uses organic EL.

The display device may be connected to a host device HOST. The touch panel PNL and the host device HOST are connected to each other via three flexible printed circuits FPC1, FPC2 and FPC3. The host device HOST is connected to the first substrate SUB1 via the flexible printed circuit FPC1. The host device HOST is connected to the second substrate SUB2 via the flexible printed circuit FPC2. The host device HOST is connected to the backlight unit BL via the flexible printed circuit FPC3.

A touch panel controller IC2 which controls touch detection is formed on the flexible printed circuit FPC2. The touch panel controller IC2 is composed of a chip-on-film (COF) chip. The touch panel controller IC2 is also referred to as a touch detection chip or a touch controller. The touch panel controller IC2 may not be a COF chip formed on the flexible printed circuit FPC2 but may be a COG chip formed on the first substrate SUB1. Similarly, the panel driver IC1 may not be a COG chip formed on the first substrate SUB1 but may be a COF chip formed on the flexible printed circuit FPC2.

The panel driver IC1 and the touch panel controller IC2 operate in an interlocked manner in terms of operation timing and are electrically connected to each other by a timing pulse, etc. The panel driver IC1 and the touch panel controller IC2 may not be structured as separate integrated circuit (IC) chips but may be structured as one IC chip. In that case, the single IC chip may be formed on the first substrate SUB1 or may be formed on the flexible printed circuit FPC2.

Although not shown in the drawing, the display device includes a secondary battery, a power circuit, etc. Further, the display device includes a coil for touch detection as will be described later.

[Pixel Array]

FIG. 2 is a block circuit diagram showing an example of a pixel array. The display area DA of the first substrate SUB1 includes a plurality of scanning lines GL and a plurality of drive electrodes TL which extend in the row direction (X direction) and a plurality of signal lines SL which extend in the column direction (Y direction). A pixel array is formed in the display area DA. The pixel has a liquid crystal element LC and a switching element SW formed of a thin film transistor (TFT). The gate terminals of the switching elements SW of the pixels in each row are connected to the same gate line GL. Both terminals of each gate line GL are drawn out to a frame area on the right and left sides of the display area DA and are connected to a gate circuit 24 arranged in the frame area. The gate circuit 24 selectively turns on the pixels on a row-by-row basis in a display period. The gate circuit 24 is not necessarily arranged in the frame area only on one side of the display area DA as shown in FIG. 2. Two gate circuits 24 may be arranged in the frame area on the right and left sides of the display area DA.

The source terminals or drain terminals of the switching elements SW of the pixels in each column are connected to the same signal line (which is also referred to as the source line) SL. One terminal of the signal line SL is drawn out to the frame area on the upper or lower side and is connected to a source amplifier 22 inside the panel driver IC1 arranged in the frame area. The source amplifier 22 supplies a video signal for display to the columns of the pixels in the row of pixels which is selectively turned on in the display period. The video signal is composed of video signals of three color components corresponding to red, green and blue, and the video signal supplied from the host device HOST to the panel driver IC1 is a multiplexed signal into which video signals of three color components corresponding to red, green and blue are multiplexed. Therefore, although not shown in the drawing, the panel driver IC1 includes a multiplexer which separates video signals of three color components corresponding to red, green and blue, and one of video signals of three color components corresponding to red, green and blue is supplied to each pixel.

In each pixel, the drain terminal or source terminal of the switching element SW is connected to one terminal of the liquid crystal element LC. The other terminals of the liquid crystal elements LC of the pixels in each row are connected to the same drive electrode TL. Both terminals of each drive electrode TL are drawn out to the frame area on the right and left sides of the display area DA and are connected to a TX drive circuit 26 arranged in the frame area. The TX drive circuit 26 supplies touch drive signals TX to the drive electrodes TL in a touch detection period. The TX drive circuit 26 supplies constant direct-current voltage to the drive electrodes TL in the display period. In the touch panel, the touch detection period and the display period are alternately repeated. The TX drive circuit 26 is not necessarily arranged in the frame area only one side of the display area DA as shown in FIG. 2. Two TX drive circuits 26 nay be arranged in the frame area on the right and left sides of the display area DA.

The panel driver IC1 controls the gate circuit 24 and the TX drive circuit 26 and cooperates with the touch panel controller IC2. The touch panel controller IC2 processes touch detection signals and obtains coordinate data of the contact position of a pen on the display surface. The coordinate data is input to the host device HOST. The panel driver IC1 performs mutual communication with the host device HOST and requests data and receives data from the host device HOST. The host device HOST can supply video data, a command, a synchronization signal, etc., to the panel driver IC1. The panel driver IC1 may receive a predetermined command based on the coordinate data or may display the locus of the coordinate data as a handwriting character.

[Electromagnetic Induction Type Touch Detection]

As shown in FIG. 3, a liquid crystal display device 1 is accommodated in a metal cover 302 and includes a light guide 304, a sensor plate 306 and a magnetic sheet 308. The sensor plate 306 can be arranged at various positions, but in FIG. 3, the sensor plate 306 is mounted between the liquid crystal display device 1 and the metal cover 302, for example. A plurality of coils are provided in the sensor plate 306. One of the coils provided in the sensor plate 306 is schematically illustrated as a coil L2.

A coil and a capacitive element (not shown) are incorporated in a pen 312. The coil incorporated in the pen 312 is schematically illustrated as a coil L1. The coil L1 and the coil L2 are coupled (magnetically coupled) with each other by a magnetic field.

The liquid crystal display device 1 includes a TFT glass substrate 314 (corresponding to the first substrate SUB1), a color filter 316 and a CF glass substrate 318 (corresponding to the second substrate SUB2). TFTs (not shown) are formed on the TFT glass substrate 314, and a structure composed of the TFT glass substrate 314 and the TFTs (not shown) is referred to as a TFT substrate in some cases. A structure composed of the CF glass substrate 318 and the color filter 316 is referred to as a color filter substrate in some cases. A liquid crystal layer which is not shown in the drawing is held between the TFT substrate 314 and the color filter substrate. The light guide 304 is fixed in such a manner as to be held between the liquid crystal display device 1 and the sensor plate 306 by a fixing portion 320.

If the pen 312 approaches or contacts the display device 1, the coil L1 approaches or contacts the coil L2, the coil L1 and the coil L2 are magnetically coupled with each other, and the approach or contact of the pen 312 is detected.

Figures 4A, 4B:
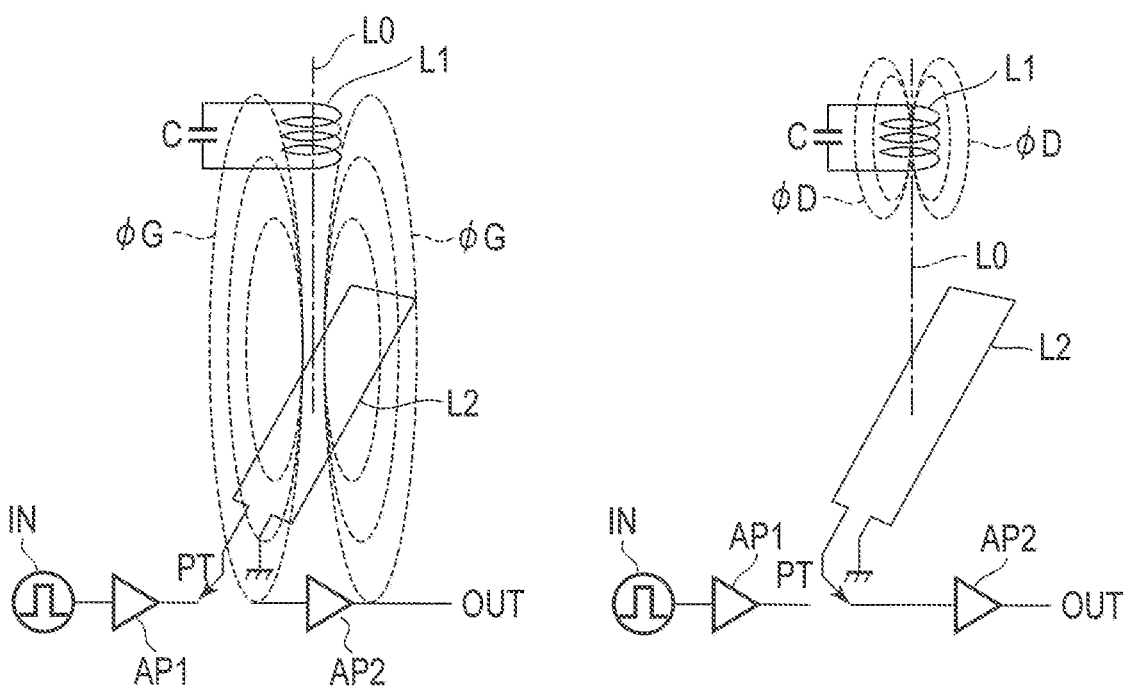
FIG. 4A is an explanatory diagram showing an electromagnetic induction type touch detection principle.
FIG. 4B is an explanatory diagram showing an electromagnetic induction type touch detection principle.

The detection principle will be described with reference to FIGS. 4A and 4B. FIG. 4A shows a state where the coil L2 generates a magnetic field, and FIG. 4B shows a state where the coil L1 generates a magnetic field.

In the pen 312, the coil L1 and the capacitive element in the pen 312 (which is also referred to simply as a capacitive element C) are connected to each other in parallel and constitute a resonant circuit. The number of turns of the coil L2 is not limited to any particular number, but FIGS. 4A and 4B show the coil L2 having one turn. The coil L2 has a pair of terminals. In touch detection, the coil L2 is connected to the output terminal of a transmitting amplifier AP1 during a given time period, and when the given time period elapses, the connection is switched and the coil L2 is connected to the input terminal of a receiving amplifier AP2 during another given time period. For the sake of convenience of explanation, FIGS. 4A and 4B show a state where one terminal PT of the coil L2 is connected to the transmitting amplifier AP1 or the receiving amplifier AP2 and the other terminal of the coil L2 is grounded. But as will be described later, in the embodiments, both terminals of the coil L2 are connected to two input terminals of a differential amplifier in the touch detection.

Figure 5:
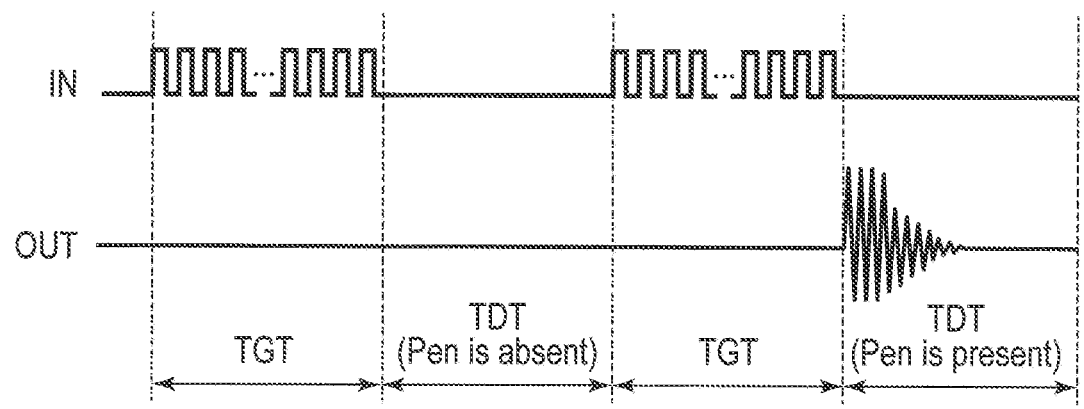
FIG. 5 is a waveform diagram showing the electromagnetic induction type touch detection principle.

FIG. 5 is a waveform diagram showing touch detection. In FIG. 5, the horizontal axis indicates time, "IN" represents the input waveform of the transmitting amplifier AP1, and "OUT" represents the output waveform of the receiving amplifier AP2. FIG. 5 shows operations in one touch detection period.

In the first given time period, that is, in a magnetic field generation period TGT, a periodically-varying transmitting signal IN is input to the transmitting amplifier AP1, and the coil L2 is connected to the output terminal of the transmitting amplifier AP1. Therefore, in the magnetic field generation period TGT, the transmitting amplifier AP1 supplies a drive signal corresponding to the amplified transmitting signal IN to the coil L2 as shown in FIG. 5. As a result, the coil L2 generates magnetic field lines φG as shown in FIG. 4A.

Since the magnetic field lines φG are centered around the winding of the coil L2, the magnetic field in the inner side of the coil L2 intensifies. If the pen 312 approaches or contacts the display device 1 and when a central axis L0 of the coil L1 is located inside the loop of the coil L2 as shown in FIG. 4A, the magnetic field lines φG generated by the coil L2 reach the coil L1. That is, the coil L1 is arranged within the magnetic field generated by the coil L2, and the coil L1 and the coil L2 are magnetically coupled with each other. The coil L2 generates magnetic field lines φG which periodically vary in accordance with the drive signal corresponding to the amplified transmitting signal IN. Therefore, inductive voltage is generated in the coil L1 by the effect of mutual induction between the coil L2 and the coil L1. The capacitive element C is charged with the induction voltage generated in the coil L1.

When the magnetic field generation period TGT elapses, the coil L2 is connected to the input terminal of the receiving amplifier AP2 during the next given time period, that is, during a magnetic field detection period or current detection period TDT. The transmitting signal IN is not input to the transmitting amplifier AP1 during the magnetic field detection period TDT. If the capacitive element C was charged during the previous magnetic field generation period TGT, the coil L1 generates a magnetic field by electric charge which has been charged into the capacitive element C. In FIG. 4B, magnetic field lines φD of the coil L1 are generated by the electric charge which has been charged into the capacitive element C.

If the pen 312 approaches or contacts the display device 1, the capacitive element C is charged during the magnetic field generation period TGT, and the magnetic field lines φD of the coil L1 reach the coil L2 during the magnetic field detection period TDT. Since a resonant circuit is composed of the coil L1 and the capacitive element C, the magnetic field generated by the coil L1 changes in accordance with a time constant of the resonant circuit. As the magnetic field generated by the coil L1 changes, induction voltage is generated in the coil L2. As induction voltage is generated, a signal in one terminal PT of the coil L2 changes. During the magnetic field detection period TDT, a change of the signal is input to the receiving amplifier AP2 as a detection signal, the signal is amplified in the receiving amplifier AP2, and a sensor signal OUT which changes in accordance with induction voltage is output from the receiving amplifier AP2.

On the other hand, if the coil L1 does not approach or contact the coil L2, the capacitive element C will not be charged, or if charged, the capacitive element C will have a small amount of electric charge during the magnetic field generation period TGT. As a result, magnetic field lines φD generated by the coil L1 during the magnetic field detection period TDT will not reach the coil L2, and a constant sensor signal OUT is output from the receiving amplifier AP2 which is connected to the coil L2 during the magnetic filed detection period TDT.

FIG. 5 shows both a state where the pen does not approach or contact the display device 1 (on the left side) and a state where the pen approaches or contacts the display device 1 (on the right side). When the pen does not approach or contact the display device 1, as shown on the left side of FIG. 5, the constant sensor signal OUT is output from the receiving amplifier AP2 during the magnetic field detection period TDT. When the pen approaches or contacts the display device 1, as shown on the right side of FIG. 5, the varying sensor signal OUT is output from the receiving amplifier AP2 during the magnetic field detection period TDT. A touch with the pen can be detected by determining that the pen is present when the sensor signal OUT varies and determining that the pen is absent when the sensor signal OUT is constant. In FIG. 5, the presence of the pen and the absence of the pen are determined, but since the amplitude of the sensor signal OUT varies in accordance with the distance between the coil L1 and the coil L2, the distance between the pen and the display device (the sensor plate 306) or the pen pressure can also be determined. When the connection of the coil L2 is switched from the output terminal of the transmitting amplifier AP1 to the input terminal of the receiving amplifier AP2 in the transition from the magnetic field generation period TGT to the magnetic field detection period TDT, the coil L2 may be disconnected from the output terminal of the transmitting amplifier AP1, and then the terminal PT of the coil L2 may be set to a floating state for predetermined time until the energy charged in the coil L2 is discharged, and after that, the coil L2 may be connected to the input terminal of the receiving amplifier AP2.

[Circuit Structure]

In the description of the touch detection principle, the same coil (coil in the sensor plate 306) L2 is used for magnetic field generation and magnetic field detection, but a coil used for magnetic field generation and a coil used for magnetic field detection may differ from each other in an embodiment. For example, a transmitting coil may be formed by the drive electrode TL and a magnetic field may be generated by the transmitting coil during the magnetic field generation period TGT, or a receiving coil may be formed by the signal line SL and a magnetic field may be detected by the receiving coil during the magnetic field detection period TDT. In this case also, the touch detection principle is the same as the principle described with reference to FIGS. 3 to 5. That is, the coil (coil in the pen) L1 generates induction voltage based on the magnetic field generated by the transmitting coil formed by the drive electrode TL, and charges the capacitive element C (FIGS. 4A and 4B), during the magnetic field generation period TGT. The receiving coil formed by the signal line SL generates induction voltage based on the magnetic field generated by the coil L1 in the pen, and outputs a change of voltage in the signal line SL as a sense signal (which is also referred to as a detection signal) which represents a result of touch detection, during the magnetic field detection period TDT.

FIG. 6 is a block circuit diagram showing an example of the in-cell type touch panel PNL. A transmitting coil TX_COIL is formed by connecting an even number of (two or more) drive electrodes TL in a loop-like manner, and a receiving coil RX_COIL is formed by connecting an even number of (two or more) signal lines SL in a loop-like manner. Both end terminals of each drive electrode TL and both end terminals of each signal line SL are connected to switches, respectively. If the switches are selectively turned on, an even number of drive electrodes TL are connected to each other to form one loop-like transmitting coil TX_COIL, and an even number of signal lines SL are connected to each other to form one loop-like receiving coil RX_COIL. Each transmitting coil TX_COIL composed of the drive electrodes TL is elongated in the X direction, and each receiving coil RX_COIL composed of the signal lines SL is elongated in the Y direction. The transmitting coils TX_COIL are arranged in the Y direction, and the receiving coils RX_COIL are arranged in the X direction.

Both terminals of each transmitting coil TX_COIL are connected to the TX drive circuit 26 on the first substrate SUB1. The TX drive circuit 26 sequentially supplies the touch drive signals TX (corresponding to the transmitting signal IN of FIG. 5) to the transmitting coils TX_COIL and performs scan driving of the transmitting coils TX_COIL. As a result, the transmitting coils TX_COIL sequentially generate magnetic fields. A large number of drive signals TX may be supplied to one transmitting coil RX_COIL during one magnetic field generation period TGT of FIGS. 5A and 5B. A magnetic field is generated from one transmitting coil TX_COIL during one magnetic field generation period TGT, and induction voltage of all receiving coils RX_COIL are examined during the next magnetic field detection period TDT. The intersection of the transmitting coil TX_COIL and the receiving coil RX_COIL in which induction voltage is detected can be determined as a touch position, and the coordinates of the intersection are determined as touch coordinates. It is possible to change the size or number of transmitting coils TX_COIL by changing the number of drive electrodes TL constituting the transmitting coil TX_COIL. Since the detection accuracy of the touch position depends on the size or number of transmitting coils TX_COIL, the position may be generally detected by a small number of large-size transmitting coils TX_COIL and then specifically detected by a large number of small-size transmitting coils TX_COIL.

Both terminals of the receiving coils RX_COIL are connected to detection circuits $62_1$ to $62_m$ (which are also referred to collectively as a detection circuit 62), respectively. The detection circuits $62_1$ to $62_m$ are formed in the touch panel controller IC2. A pulse generator 68 which generates the touch drive signal TX which is a high frequency pulse is also formed in the touch panel controller IC2. The outputs of the detection circuits $62_1$ to $62_m$ are supplied to a processor 66 in the host device HOST as digital signals via an A/D converter 62 formed in the touch panel controller IC2.

Figure 7A:
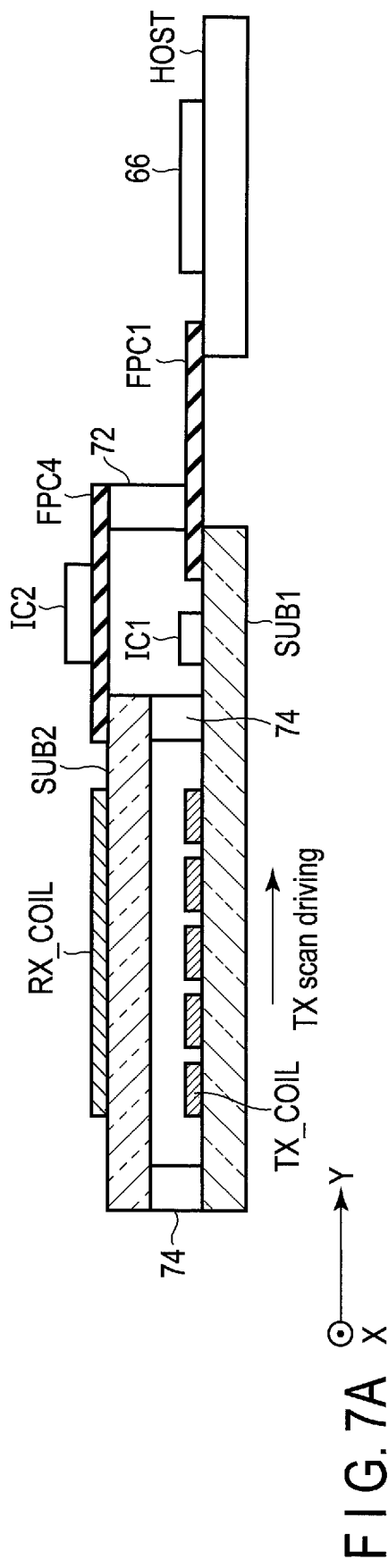
FIG. 7A is a sectional view showing an example of a transmitting coil TX_COIL and a receiving coil RX_COIL.
Figure 7B:
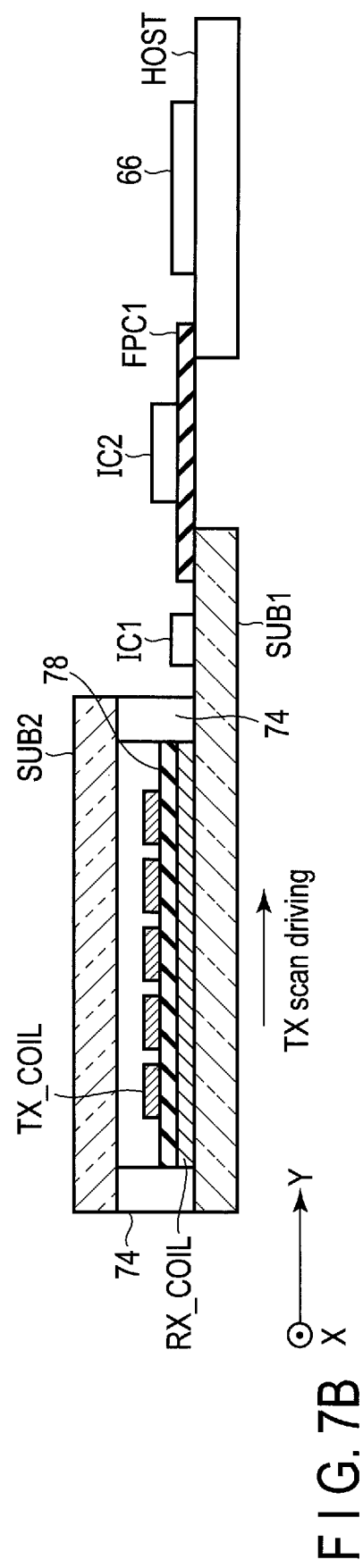
FIG. 7B is a sectional view showing another example of the transmitting coil TX_COIL and the receiving coil RX_COIL.

FIGS. 7A and 7B are sectional views showing examples of the arrangement of the transmitting coils TX_COIL and the receiving coils RX_COIL. In the example shown in FIG. 7A, the transmitting coils TX_COIL (drive electrodes TL) are arranged on the first substrate SUB1, and the receiving coils RX_COIL (signal lines SL) are arranged on the second substrate SUB2, although only one of the receiving coils RX_COIL is illustrated. In the example shown in FIG. 7B, the receiving coils RX_COIL (signal lines SL) are arranged on the first substrate SUB1, although only one of the receiving coils RX_COIL is illustrated, and the transmitting coils TX_COIL (drive electrodes TL) are arranged on the receiving coils RX_COIL (signal lines SL) via an insulating layer 78.

In the examples shown in FIGS. 7A and 7B, the second substrate SUB2 is arranged on the first substrate SUB1 via sealants 74 provided on terminal portions, and the liquid crystal layer is arranged between the first substrate SUB1 and the second substrate SUB2. In the example shown in FIG. 1, the touch panel controller IC2 is mounted on the flexible printed circuit FPC2 which connects the host device HOST and the second substrate SUB2, but in the example shown in FIG. 7A, the touch panel controller IC2 is mounted on a flexible printed circuit FPC4 which is connected to the second substrate SUB2. The flexible printed circuit FPC4 is connected to the flexible printed circuit FPC1 via a contact 72. In the example shown in FIG. 7B, the touch panel controller IC2 is mounted on the flexible printed circuit FPC1 which connects the host device HOST and the first substrate SUB1.

FIG. 8 is an example of the specific circuit diagram in the touch panel controller IC2. The output of the pulse generator 68, that is, the touch drive signal TX is supplied to the TX drive circuit 26 or a delay adjustment circuit 94 via a selector 92. The selector 92 is switched under the control of the processor 66. The selector 92 is connected to the TX drive circuit 26 during the magnetic field generation period TGT and is connected to the delay adjustment circuit 94 during the magnetic field detection period TDT. A first terminal of the transmitting coil TX_COIL is connected to the TX drive circuit 26 and a second terminal of the transmitting coil TX_COIL is grounded. Both terminals of the receiving coil RX_COIL are connected to the two input terminals of a differential amplifier 82. FIG. 8 shows one transmitting coil TX_COIL and one receiving coil RX_COIL, but in practice, a large number of transmitting coils TX_COIL are connected to the drive circuit 26 and a large number of receiving coils RX_COIL are connected to the differential amplifier 82, respectively.

Figure 9:
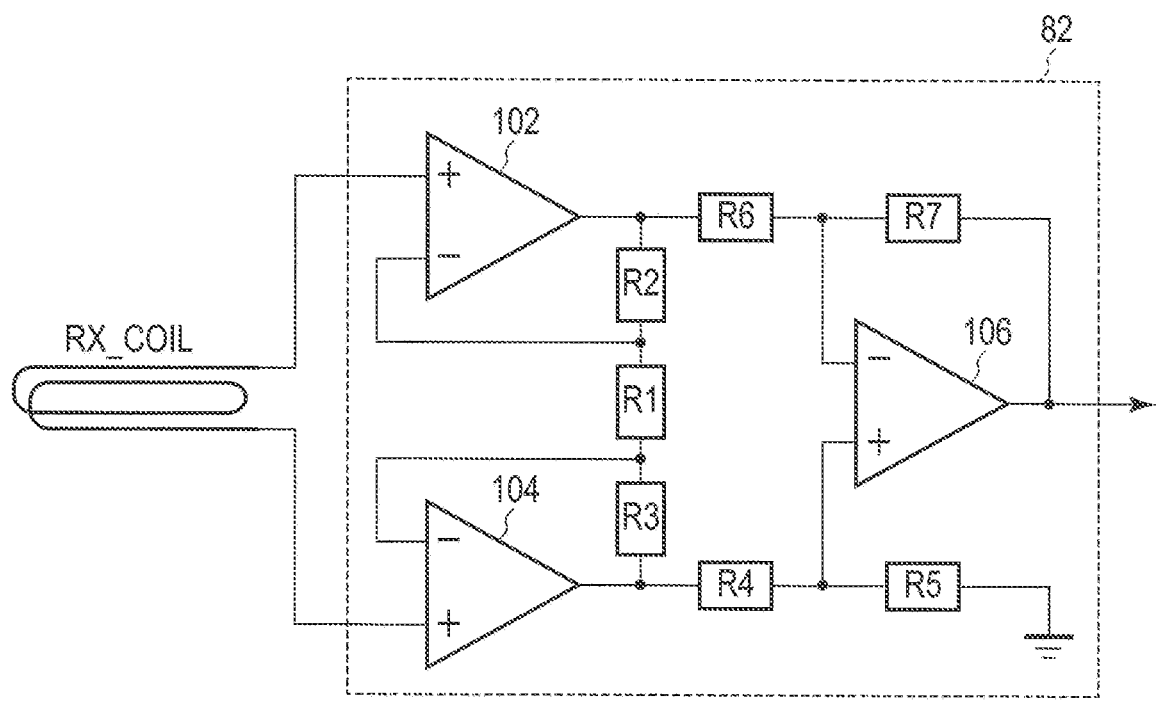
FIG. 9 is a circuit diagram showing an example of a differential amplifier 82.

FIG. 9 is an example of the circuit diagram of the differential amplifier 82. The differential amplifier 82 is composed of three operational amplifiers 102, 104 and 106 and seven resistors R1 to R7. Two operational amplifiers 102 and 104 are connected in an input stage. The signal of a first terminal of the receiving coil RX_COIL is input to the non-inverting input terminal of the operational amplifier 102, and the signal of a second terminal of the receiving coil RX_COIL is input to the non-inverting input terminal of the operational amplifier 104. The three resistors R2, R1 and R3 are connected in series between the output terminals of the operational amplifiers 102 and 104. The connection point of the resistors R1 and R2 is connected to the inverting input terminal of the operational amplifier 102, and the connection point of the resistors R1 and R3 is connected to the inverting input terminal of the operational amplifier 104. The output terminal of the operational amplifier 102 is connected to the inverting input terminal of the operational amplifier 106 via the resistor R6. The output terminal of the operational amplifier 104 is connected to the non-inverting input terminal of the operational amplifier 106 via the resistor R4. The output terminal of the operational amplifier 106 is connected to the inverting input terminal of the operational amplifier 106 via the resistor R7. The non-inverting input terminal of the operational amplifier 106 is grounded via the resistor R5.

The output of the operational amplifier 106 becomes the output of the differential amplifier 82.

Assuming that the resistor R6 and the resistor R4 have the same resistance value and the resistor R7 and the resistor R5 have the same resistance value, an output Vo of the operational amplifier 106 is expressed as follows:

$$V_o=(R7/R6)(1+((R2+R3)/R1))(Vp-V_n)$$

where Vp is a positive-phase signal and Vn is a negative-phase signal.

The signals of both terminals of each receiving coil RX_COIL are input to both input terminals of the differential amplifier 82, respectively. In the receiving coil RX_COIL, voltage is also generated by disturbance noises in addition to the induction voltage generated by the change in the magnetic flux from the coil L1 in the pen as shown in FIGS. 4A and 4B. The induction voltages become signals having opposite phases in the terminals of the receiving coil RX_COIL, and the voltages generated by disturbance noises become signals having the same phase in the terminals of the receiving coil RX_COIL. Therefore, when the signals of the terminals of the receiving coil RX_COIL are amplified by the differential amplifier 82, the disturbance noise component is canceled and only the induction voltage component is amplified. The differential amplifier 82 amplifies and outputs a signal of the sum of the absolute values of the amplitudes of the positive-phase signal and the negative-phase signal.

The output of the differential amplifier 82 in the first stage is further amplified by an amplifier 84 in the next stage. Since noises are removed in the differential amplifier 82 in the first stage, an amplification factor can be increased in the amplifier 84 in the second stage. Therefore, a touch can be accurately detected even from a very small signal.

The output of the amplifier 84 is rectified, for example, half-wave rectified in a rectifier 86. The output of the rectifier 86 is input to an integrator 88, and the sensor signal is accumulated. The output of the integrator 88 is converted to a digital signal by an A/D converter 90 and is supplied to the processor 66. The processor 66 detects a touch if the output digital signal of the A/D converter 90 is greater than a threshold value. In light of the hysteresis characteristics of a cumulative value of the sensor signal, a threshold value for detecting a change from a non-touch state to a touch state and a threshold value for detecting a change from a touch state to a non-touch state may differ from each other.

When the inductance and the capacitance of the coil L1 are changed by the pushing force of the pen onto the display device 1, the resonance frequency is changed. As the resonance frequency changes, the magnetic field from the coil L1 also changes, and the phase of the induction voltage generated in the coil L2 changes, accordingly. If the detection circuit 62 detects the phase of the sensor signal with respect to the touch drive signal TX, the detection circuit 62 can also detect the pen pressure. Therefore, the output of the rectifier 86 is input to a first input terminal of a comparator 96. The touch drive signal TX output from the pulse generator 68 is supplied to a second input terminal of the comparator 96 via the delay adjustment circuit 94. Even if the resonance frequency is not changed, a phase shift still occurs to the sensor signal in the differential amplifier 82 and the amplifier 84. The delay adjustment circuit 94 compensates for this phase shift in the differential amplifier 82 and the amplifier 84, and the phase of the touch drive signal TX is shifted by the same amount as the phase shift in the differential amplifier 82 and the amplifier 84. Accordingly, the comparator 96 can extract only a component having the same phase as that of the touch drive signal TX from the output of the rectifier 86, and a phase difference of the sensor signal with respect to the touch drive signal TX can be detected.

The output of the comparator 96, that is, a phase difference detection signal is input to an integrator 98, and the phase difference detection signal is accumulated. The output of the integrator 98 is converted to a digital signal by an A/D converter 100 and is supplied to the processor 66. The processor 66 detects pen pressure in accordance with the output digital signal of the A/D converter 100. In light of the hysteresis characteristics of a cumulative value of the sensor signal, a threshold value for detecting a change from high pen pressure to low pen pressure and a threshold value for detecting a change from low pen pressure to high pen pressure may differ from each other. If pen pressure is detected, when a handwriting character is displayed based on the locus of coordinates of touch detection, the thickness of the character can be changed in accordance with the pen pressure, and the usability of the touch panel can be improved.

Summary of First Embodiment

According to the first embodiment, both terminals of the receiving coil RX_COIL are connected to two input terminals of the differential amplifier 82. In accordance with a change of the magnetic field generated by the coil L1 in the pen, induction voltages of the opposite phases are generated in the terminals of the receiving coil RX_COIL. Since the signals of the terminals of the receiving coil RX_COIL are amplified by the differential amplifier 82, the same-phase voltages generated by disturbance noises in the terminals of the receiving coil RX_COIL are canceled, and only the induction voltages of the opposite phases generated in the terminals of the receiving coil RX_COIL are amplified. Therefore, even if the amplitude of the signals generated in the terminals of the receiving coil RX_COIL is small, the detection accuracy can be increased by amplifying only the induction voltage component. Further, according to the first embodiment, a phase difference of the sensor signal with respect to the touch drive signal TX can also be detected, and therefore pen pressure can be detected.

Second Embodiment

Although the approach (in the air) and the contact are detected as a touch collectively in the first embodiment, the level of the sensor signal may vary between the approach (in the air) and the contact in some cases. Therefore, the sensor signal in the detection of contact may exceed the dynamic ranges of the A/D converters 90 and 100 in some cases.

In the second embodiment, the touch detection mode further includes an approach detection mode (which is also referred to as a hover mode) and a contact detection mode (which is also referred to as a pen mode), and one of the modes is selectively set in accordance with the sensor signal. When the pen contacts the display device, the pen approaches the display device first and then the pen contacts the display device. Therefore, the hover mode is initially set, and the approach of the pen is determined. If the sensor signal becomes higher than the first threshold value in the hover mode, the pen is determined to be very close to the display device, and the detection mode is switched to the pen mode. The first threshold value may be, for example, 75% (≈768) of the dynamic range if the number of bits of the A/D converter 90 is 10 bits (0 to 1023). Further, if the sensor signal becomes lower than the second threshold value in the pen mode, the pen is determined to be away from the display device, the detection mode is switched to the hover mode. The second threshold value may be 25% (≈256) of the dynamic range, for example.

In the second embodiment, the gain of the detection circuit 62 is switched in accordance with the set detection mode. For example, as shown in FIG. 10, a differential amplifier 82A includes a switch 104 which can switch its own gain between a high gain and a low gain. The switch 104 changes the resistance value of the resistor R1, R2, R3, R6 or R7 shown in FIG. 9 and is switched under the control of the processor 66. The other structure is the same as that of the first embodiment.

FIG. 11 is a flowchart showing an example of the operation of the second embodiment. In step S12, the processor 66 sets the gain of the differential amplifier 82A to the high gain to execute the hover mode. Since the sensor signal is relatively small in the hover mode, even if the sensor signal is amplified at the high gain by the detection circuit 62, the amplified sensor signal falls within the dynamic ranges of the A/D converters 90 and 100. In step S14, the processor 66 determines whether the pen approaches the display device or not based on the output of the A/D converter 90 and obtains the coordinate data of the detected pen. A threshold value set for approach detection is the third threshold value which is a value intermediate between the first and second threshold values set for mode switching (for example, 50% of the dynamic range (=512)).

In step S16, the host processor 66 determines whether the output of the A/D converter 90 is greater than the first threshold value. If the output signal of the A/D converter 90 is not greater than the first threshold value (NO in step S16), the pen is determined to be away from the display device, and the processor 66 repeats the approach detection processing of step S14. If the output signal of the A/D converter 90 is greater than the first threshold value (YES in step S16), the pen is determined to be very close to the display device, and in step S18, the processor 66 switches the mode and sets the gain of the differential amplifier 82A to the low gain to execute the pen mode. Since the sensor signal in the pen mode is large, even if the sensor signal is amplified at the low gain by the detection circuit 62, the amplified sensor signal is subsequently equal to the sensor signal in the hover mode and falls within the dynamic ranges of the A/D converters 90 and 100. In step S20, the host processor 66 detects whether the pen contacts the display device or not based on the output of the A/D converter 90 and obtains the coordinate data of the contacting pen. A threshold value set for contact detection is the fourth threshold value which is a value intermediate between the first and second threshold values for mode switching, and may be the same as or different from the third threshold value set for approach detection in the hover mode.

In step S22, the processor 66 determines whether the output of the A/D converter 90 is greater than the second threshold value. If the output signal of the A/D converter 90 is greater than the second threshold value (YES in step S22), the pen is determined to be very close to the display device, and the host processor 66 repeats the contact detection processing of step S20. If the output signal of the A/D converter 90 is not greater than the second threshold value (NO in step S22), the pen is determined to be away from the display device, and the processing returns to step S12 and switches the detection mode to the hover mode.

Summary of Second Embodiment

According to the second embodiment, whether the pen is away from the display device or the pen is very close to the display device is determined based on the sensor signal, and the gain of the differential amplifier 82A of the detection circuit 62 is switched in accordance with the determination result. Therefore, when the pen contacts the display device, the sensor signal does not exceed the dynamic range of the A/D converters 90 and 100, and the touch detection can be performed favorably in both detection modes, that is, in both the hover mode and the pen mode. The gain of the differential amplifier 82A can be easily switched by switching the resistor of the differential amplifier 82A. The gain is switched between two levels, that is, between a high level and a low level, but the gain may be switched among two or more levels by setting two or more threshold values.

Third Embodiment

Although the above-described embodiments relate to electromagnetic induction type touch detection, the third embodiment which will be described below can also perform capacitive type touch detection.

FIG. 12 is an example of the circuit diagram of the third embodiment. A second terminal of the transmitting coil TX_COIL is grounded via a switch 112. If the switch 112 is ON, the second terminal of the transmitting coil TX_COIL is grounded, and if the switch 112 is OFF, the second terminal of the transmitting coil TX_COIL is set to a floating state. The switch 112 is controlled by the processor 66. A first terminal of the transmitting coil TX_COIL is connected to the TX drive circuit 26.

A switch circuit 110 is connected between the receiving coil RX_COIL and the differential amplifier 82. The switch circuit 110 includes a first switch 110a and a second switch 110b. An input terminal of the first switch 110a is connected to a first terminal of the receiving coil RX_COIL (for example, the terminal on the positive-phase signal side), a first output terminal of the first switch 110a is connected to a first input terminal of the differential amplifier 82 (the non-inverting input terminal of the operational amplifier 102 shown in FIG. 9), and a second output terminal of the first switch 110a is connected to the integrator 88. An input terminal of the second switch 110b is connected to a second terminal of the receiving coil RX_COIL (for example, the terminal on the negative-phase signal side), a first output terminal of the second switch 110b is connected to a second input terminal of the differential amplifier 82 (the non-inverting input terminal of the operational amplifier 104 shown in FIG. 9) and a second output terminal of the second switch 110b is connected to the input terminal of the first switch 110a. The first switch 110a and the second switch 110b are switched under the control of the processor 66. The first switch 110a and the second switch 110b interlock each other, and when the first switch 110a is switched to the first output terminal side, the second switch 110b is also switched to the first output terminal side, and when the first switch 110a is switched to the second output terminal side, the second switch 110b is also switched to the second output terminal side. The other structure is the same as that of the first embodiment.

When the second switch 110b is connected to the second output terminal side, both terminals of the detecting coil RX_COIL are short-circuited. At this time, the first switch 110a is also connected to the second output terminal side, and therefore the output signal of the detecting coil RX_COIL is integrated by the integrator 88. At this time, if the switch 112 is set to OFF and the second terminal of the transmitting coil TX_COIL is set to a floating state, current is not supplied to the transmitting coil TX_COIL and the transmitting coil TX_COIL does not generate a magnetic field. Therefore, the receiving coil RX_COIL does not serve as a coil but serves as a mere conductor, and a change in electrostatic capacitance caused by a touch of a user's finger can be detected by this conductor, and capacitive type touch detection will be performed by the detection circuit 62.

When the first and second switches 110a and 110b are connected to the first output terminal side, both terminals of the detecting coil RX_COIL are connected to two input terminals of the differential amplifier 82, respectively, and the detection circuit 62 performs electromagnetic induction type touch detection as is the case with the first and second embodiments.

Figure 13:
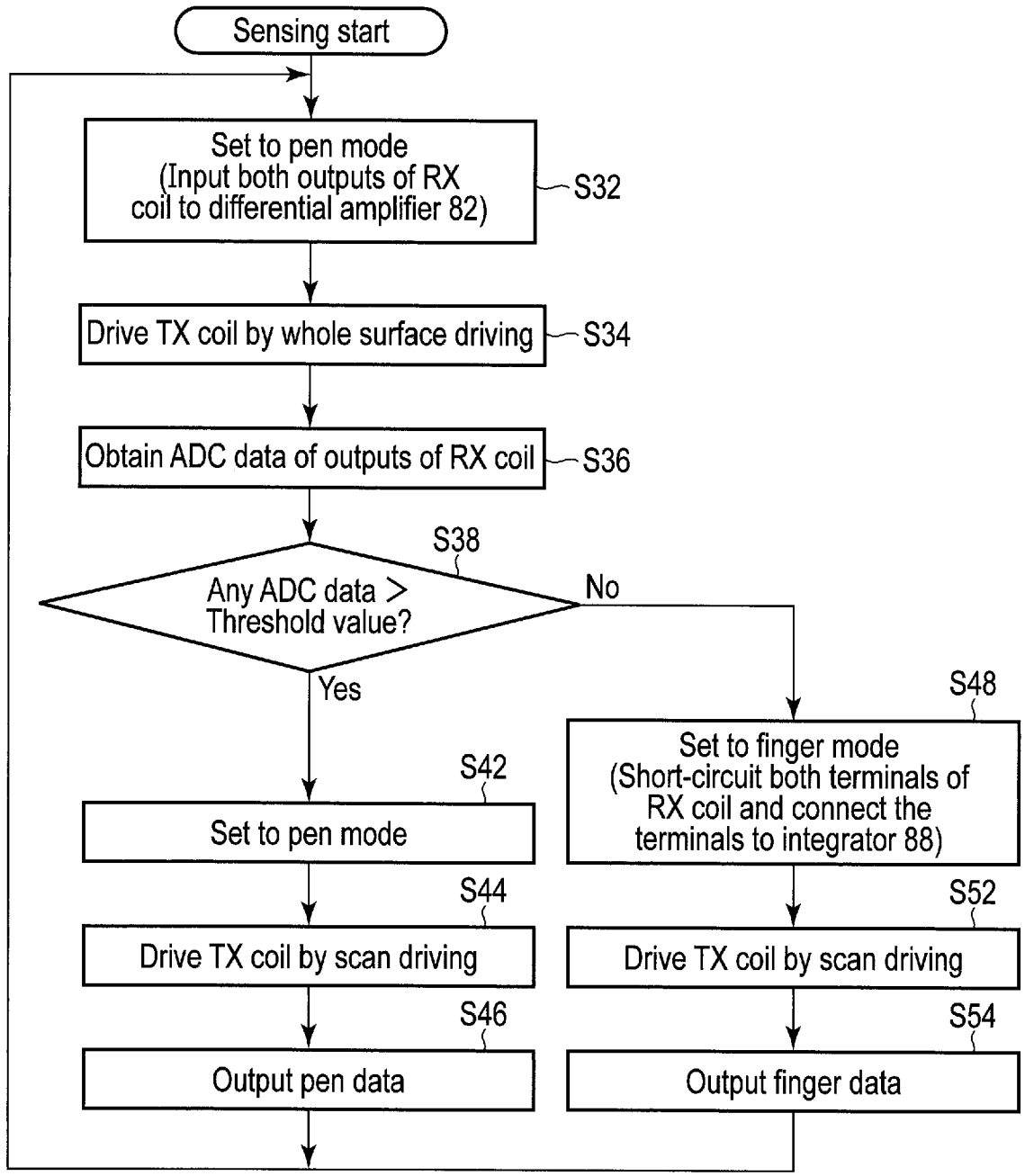
FIG. 13 is a flowchart showing an example of the operation of the third embodiment.

FIG. 13 shows an example of the operation of dynamically switching between the electromagnetic induction type touch detection and the capacitive type touch detection by using the circuit structure shown in FIG. 12. For the sake of convenience, the electromagnetic induction type touch detection is referred to as a pen mode, and the capacitive type touch detection is referred to as a finger mode.

In the touch panel, display and touch detection are alternately repeated, but FIG. 13 shows the operation of one touch detection period. In step S32, the processor 66 switches the switch circuit 110 to the first output terminal side to execute the pen mode, and connects both terminals of the detecting coil RX_COIL to two input terminals of the differential amplifier 82, respectively. In step S34, the host processor 66 sets the switch 112 to ON and supplies the drive signal TX from the TX drive circuit 26 to the transmitting coil TX_COIL. At this time, substantially all the drive electrodes TL are connected to each other and constitute one large transmitting coil TX_COIL, and the transmitting coils TX_COIL are driven across the whole surface. Since a magnetic field generated by the transmitting coil TX_COIL is proportional to the size of the coil, the magnetic filed generated by the whole surface driving is greater than the magnetic filed generated by the sequential scan driving. Therefore, the detection sensitivity to the approach of the pen improves. As described in the second embodiment, the pen approaches the display device first and then contacts the display device, and therefore in the whole surface driving, the differential amplifier 82 of the third embodiment may be replaced with the differential amplifier 82A of the second embodiment and the gain may be set to a high gain.

In step S36, the processor 66 receives each output of the detection circuits 62 via an A/D converter 90. In step S38, the processor 66 determines whether any of the detection results is greater than a threshold value. This threshold value may be, for example, 25% (≈256) of the dynamic range if the number of bits of the A/D converter 90 is 10 bits (0 to 1023). If any of the detection results is greater than the threshold value, the processor 66 determines that the pen is approaching, and then in step S42, the processor 66 switches the switch circuit 110 to the first output terminal side to execute the pen mode and connects both terminals of the detecting coil RX_COIL to two input terminals of the differential amplifier 82. In step S44, the processor 66 sets the switch 112 to ON and supplies the drive signal TX from the TX drive circuit 26 to the transmitting coil TX_COIL. At this time, the drive electrodes TL are connected to each other such that a group of several drive electrodes TL is formed, and as a result, a large number of transmitting coils TX_COIL are formed and the large number of transmitting coils TX_COIL are driven by the sequential scan driving. If the gain of the differential amplifier 82 in the whole surface driving is set to a high gain, the gain of the differential amplifier 82 in the scan driving will be set to a low gain.

In step S46, the processor 66 receives each output of the detection circuits 62 via the A/D converter 90, detects a touch of the pen, and outputs pen data indicating a touch position of the pen. If one touch detection period ends, the display period follows, and when the next touch detection period comes, the processing returns to step S32.

If none of the detection results is greater than the threshold value in step S38, the processor 66 determines that the pen is not approaching, and in step S48, the processor 66 switches the switch circuit 110 to the second output terminal side to execute the finger mode, short-circuits both terminals of the detecting coil RX_COIL, and connects the detecting coil RX_COIL to the integrator 88. In step S52, the processor 66 sets the switch 112 to ON and passes the drive signal TX from the TX drive circuit 26 to the transmitting coil RX_COIL. At this time, the drive electrodes TL are connected to each other and a group of several drive electrodes TL is formed, and as a result, a large number of transmitting coils TX_COIL are formed and the large number of transmitting coils TX_COIL are driven by the sequential scan driving. If the gain of the differential amplifier 82 in the whole surface driving is set to a high gain, the gain of the differential amplifier 82 in the scan driving will be set to a low gain.

In step S54, the processor 66 receives each output of the detection circuits 62 via the A/D converter 90, detects a touch of a finger, and outputs finger data indicating a touch position of the finger. If one touch detection period ends, the display period follows, and when the next touch detection period comes, the processing returns to step S32.

Summary of Third Embodiment

According to the third embodiment, with the switch circuit 110 which selectively short-circuits both terminals of the receiving coil RX_COIL, the receiving coil RX_COIL can function not as a coil but as a conductor, and capacitive type touch detection can also be performed. With the switch circuit 110, both terminals of the receiving coil RX_COIL can also be connected to two input terminals of the differential amplifier 82, and electromagnetic induction type touch detection can also be performed. Further, substantially all drive electrodes TL are connected to each other to constitute one large transmitting coil TX_COIL, and based on the output level of the receiving coil RX_COIL in the whole surface driving of the transmitting coil TX_COIL, the pen mode and the finger mode can be automatically switched to each other.

[Example of Layout]

Figure 14:
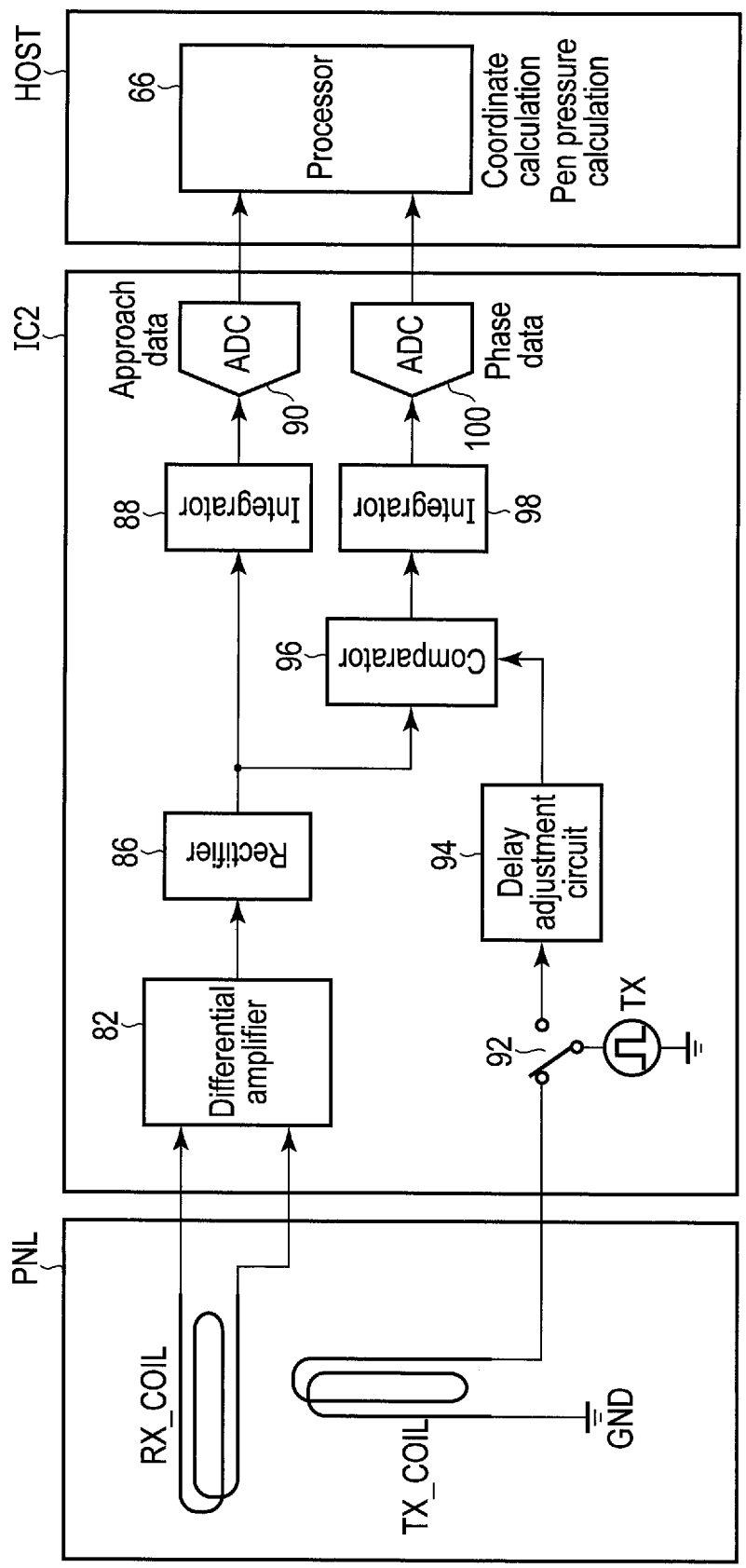
FIG. 14 is a block circuit diagram showing an example of the layout of circuits for touch detection.

FIGS. 14 and 15 show examples of the layout of the circuits of the above-described embodiments. In FIG. 14, the transmitting coil TX_COIL and the receiving coil RX_COIL are provided in the touch panel PNL and the processor 66 is provided in the host device HOST, and the others are provided in the touch panel controller IC2. In FIG. 14, an analog signal which represents induction voltage of the receiving coil RX_COIL output from the differential amplifier 82 is subjected to processing such as rectification, comparison and integration in the touch panel controller IC2, and is input to the processor 66 as digital data which indicates approach or contact.

In FIG. 15, the transmitting coil TX_COIL and the receiving coil RX_COIL are provided in the touch panel PNL and the processor 66 is provided in the host device HOST, and the others are provided in the touch panel controller IC2. Unlike the example shown in FIG. 14, in the example shown in FIG. 15, the touch panel controller IC2 does not perform processing such as rectification, comparison and integration, and the output waveform of the receiving coil RX_COIL is simply converted from an analog waveform to a digital waveform and is input to the processor 66 as digital waveform data. The processor 66 performs processing such as rectification, comparison and integration based on the digital data. Further, to detect the phase difference between the received signal and the drive signal, the drive signal is also input to the processor 66 as digital data via an A/D converter 114. In the example shown in FIG. 15, the structure of the touch panel controller IC2 is simplified, and the energy consumption is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A touch detection device comprising:
    a touch panel comprising a transmitting coil and a receiving coil, the touch panel provided with a display function and a touch detection function;
    a differential amplifier comprising two input terminals connected to first and second terminals of the receiving coil;
    a comparator configured to detect a phase difference between a drive signal supplied to the transmitting coil and an output signal of the differential amplifier; and
    a compensation circuit configured to compensate for a phase delay of the differential amplifier,
    wherein the drive signal is input to the comparator via the compensation circuit.

2. The touch detection device of claim 1, wherein
    the differential amplifier comprises a first operational amplifier, a second operational amplifier and a third operational amplifier,
    an output terminal of the first operational amplifier is connected to an inverting input terminal of the third operational amplifier,
    an output terminal of the second operational amplifier is connected to a non-inverting input terminal of the third operational amplifier,
    an inverting input terminal of the first operational amplifier and an inverting input terminal of the second operational amplifier are connected to each other,
    the first terminal of the receiving coil is connected to a non-inverting input terminal of the first operational amplifier, and
    the second terminal of the receiving coil is connected to a non-inverting input terminal of the second operational amplifier.

3. The touch detection device of claim 2, wherein
    the output terminal of the first operational amplifier is connected to the inverting input terminal of the first operational amplifier via a first resistor,
    the output terminal of the second operational amplifier is connected to the inverting input terminal of the second operational amplifier via a second resistor,
    a third resistor is connected between the first resistor and the second resistor,
    the output terminal of the first operational amplifier is connected to the inverting input terminal of the third operational amplifier via a fourth resistor,
    the output terminal of the second operational amplifier is connected to the non-inverting input terminal of the third operational amplifier via a fifth resistor,
    an output terminal of the third operational amplifier is connected to the inverting input terminal of the third operational amplifier via a sixth resistor,
    the non-inverting input terminal of the third operational amplifier is grounded via a seventh resistor, and
    the touch detection device further comprises:
    a gain adjustment circuit configured to change a gain of the differential amplifier by changing resistor values of one or more of the first resistor, the second resistor, the third resistor, the fourth resistor, the fifth resistor, the sixth resistor and the seventh resistor.

4. The touch detection device of claim 1, wherein
    the touch panel comprises:
        pixels arranged in a two-dimensional array in an X direction and a Y direction;
        drive electrodes connected to rows of the pixels arranged in the X direction and extending in the X direction; and
        signal lines connected to columns of the pixels in the Y direction and extending in the Y direction,
    the transmitting coil comprises the drive electrodes, and
    the receiving coil comprises the signal lines.

5. The touch detection device of claim 4, wherein the touch panel comprises:
    a first substrate comprising the pixels;
    a second substrate arranged on the first substrate and comprising a color filter; and
    a liquid crystal layer arranged between the first substrate and the second substrate,
    the drive electrodes are formed on the first substrate, and
    the signal lines are formed on the second substrate.

6. The touch detection device of claim 4, wherein
    the touch panel comprises:
        a first substrate comprising the pixels;
        a second substrate arranged on the first substrate and comprising a color filter; and
        a liquid crystal layer arranged between the first substrate and the second substrate,
    the signal lines are formed on the first substrate, and
    the drive electrodes are formed on the signal lines via an insulating layer.

\* \* \* \* \*